United States Patent [19]

Longa et al.

[11] Patent Number: 5,311,668
[45] Date of Patent: May 17, 1994

[54] WHEEL POSITION MEASURING APPARATUS

[75] Inventors: Simone Longa, Arcisate; Marco Castelnuovo, Milan, both of Italy

[73] Assignee: Hofmann Werkstatt-Technik GmbH, Pfungstadt, Fed. Rep. of Germany

[21] Appl. No.: 118,690

[22] Filed: Sep. 10, 1993

Related U.S. Application Data

[63] Continuation of Ser. No. 903,945, Jun. 26, 1992, abandoned.

[30] Foreign Application Priority Data

Jun. 29, 1991 [DE] Fed. Rep. of Germany ....... 4121655

[51] Int. Cl.[5] ............................................. G01B 7/315
[52] U.S. Cl. ............................. 33/203.18; 33/203.19; 33/203.12
[58] Field of Search ........... 33/203.18, 203.19, 203.12, 33/203.14, 203.15, 203.16, 203.17, 203.2, 203.21, 400, 203

[56] References Cited

U.S. PATENT DOCUMENTS

| | | | |
|---|---|---|---|
| 1,123,269 | 1/1915 | Frame | 33/400 |
| 3,892,042 | 7/1975 | Senften . | |
| 4,192,074 | 3/1980 | Chang | 33/203.15 X |
| 4,261,108 | 4/1981 | Davis . | |
| 4,631,832 | 12/1986 | Schrammen et al. | 33/203.12 X |
| 4,953,296 | 9/1990 | Spainhour | 33/203.18 |
| 5,020,231 | 6/1991 | Huynh | 33/203.18 |
| 5,052,111 | 10/1991 | Carter et al. | 33/203.18 |

FOREIGN PATENT DOCUMENTS

| | | | |
|---|---|---|---|
| 0034923 | 9/1981 | European Pat. Off. . | |
| 0389669 | 10/1990 | European Pat. Off. | 33/203.18 |
| 2326679 | 4/1977 | France . | |
| 2356122 | 2/1978 | France | 33/203.18 |
| 2017900 | 10/1979 | United Kingdom . | |
| 2025064 | 1/1980 | United Kingdom | 33/203.18 |

Primary Examiner—William A. Cuchlinski, Jr.
Assistant Examiner—Alvin Wirthlin
Attorney, Agent, or Firm—Cushman, Darby & Cushman

[57] ABSTRACT

A wheel position measuring apparatus comprises a detector device and a wheel adaptor for fixing the detector device to a motor vehicle wheel whose position is to be measured, in aligned relationship relative to the wheel axis. Connected between the detector device and the wheel adaptor is an angle measuring device for measuring the angle between the wheel adaptor when secured to the wheel and the detector device, in a plane which is perpendicular to the axis of the wheel, with the apex of the angle being on the axis of the wheel.

8 Claims, 4 Drawing Sheets

WHEEL POSITION MEASURING APPARATUS

This is a continuation of U.S. application Ser. No. 07/903,945, filed on Jun. 26, 1992, which is now abandoned.

BACKGROUND OF THE INVENTION

There are various forms of equipment for measuring the position of a motor vehicle wheel, typically comprising a detector device and a wheel adaptor with which the detector device can be fixed to the motor vehicle wheel to be measured, in aligned relationship with respect to the axis of the wheel.

Wheel position measuring apparatuses of that kind which may be optical measuring apparatuses and which may use projectors and measuring mirrors as the detector devices are fixed to the respective vehicle wheel whose position is to be measured, by means of the wheel adaptor. Other forms of such apparatuses operate by measurement using mechanical and electromagnetic systems.

However, before measurement operations can be carried out, it is necessary to perform an operation such as to compensate for any out-of-truth of the wheel and more particularly the rim portion thereof. For that purpose, an optical or electronic sensor is mounted on the wheel which is in a condition of being lifted off the ground, by means of the wheel adaptor, and the, when the motor vehicle wheel is rotated, any deflection movement due to possible out-of-trust or run-out of the wheel rim is measured in two planes (in respect of camber and track), such deflection movement occurring as a sinusoidal movement. However, when the wheel is lowered on to the ground again after that measuring operation, it is found that, due to the nature of the wheel suspension and the mounting thereof to the motor vehicle, it experiences an angular displacement relative to the reference angle position (which can also be referred to as the zero point) which was ascertained in the operation of compensating for any out-of-trust of the wheel rim, when the wheel was in a lifted condition. That angular displacement then appears in the form of a measurement error in the subsequent measurements in respect of the wheel position.

Measurements in respect of steering swivel pin angle and sum angle are effected by applying steering lock. With some types of vehicles and in particular modern sportscars, that operation can involve some difficulties as spoilers, downwardly extended guard plates and the like are in the way of a pivotal movement, in particular of a detector which is arranged as a front sensor on the motor vehicle wheel, on an arm which projects forwardly of the vehicle. It frequently happens also that pivotal movement of that kind is impeded by obstacles on the ground. Those problems and difficulties arise in particular in the case of motor vehicles which have a low ride height so that their body has only a small amount of ground clearance.

SUMMARY OF THE INVENTION

An object of the present invention is to provide a wheel position measuring apparatus such as to eliminate angle errors which result from the vehicle wheel being raised and lowered and difficulties arising out of obstacles to the application of steering lock in the wheel position measuring operation.

Another object of the present invention is to provide a wheel position measuring apparatus which is of a compact and easily handleable design configuration.

Still another object of the present invention is to provide a wheel position measuring apparatus which gives accurate and reliable results while being easy to operate.

In accordance with the principles of the present invention, the foregoing and other objects are achieved by a wheel position measuring apparatus comprising a detector device and a wheel adaptor for fixing the detector device to a motor vehicle wheel to be measured, in aligned relationship relative to the axis of the wheel. Connected between the detector device and the wheel adaptor is an angle measuring device adapted for measuring an angle between the wheel adaptor which is fixed to the motor vehicle wheel and the detector device in a plane perpendicular to the wheel axis, with the apex of the angle being on the wheel axis.

In a preferred feature of the invention, the detector device is mounted on the wheel axis on the wheel adaptor in a pivot bearing in such a way that is pivotal movement of the detector device about the wheel axis can be determined by the angle measuring device about the that purpose preferably has a sensing means for sensing the pivotal movement. It may be noted in that respect that the pivotal movement may be a movement which is performed by an operator in order to move the detector device into a given position, for example after a motor vehicle wheel which has been lifted off the ground is lowered back on to the ground, thereby to move it into an angular position which is plumbed with the horizontal. It is however also possible for the detector device, under the effect of the force of gravity, automatically to assume a pivotal position. That pivotal movement can also be sensed by the angle measuring device and the corresponding pivot angle can thus be ascertained.

The pivot bearing may be in particular in the form of ball bearing assemblies and may be provided on a mounting shaft or trunnion which is fixedly connected to the wheel adaptor. A gear can be fixedly connected to the wheel adaptor and more especially to the mounting shaft or trunnion, to permit sensing of the pivotal movement of the detector device. Meshing with the gear fixed to the wheel adaptor is a further gear which is carried on a shaft of the sensing means which includes a measuring transducer, for example in the form of a potentiometer. When the pivotal movement occurs, the gear which is connected to the measuring transducer is rotated and the measuring transducer generates an electrical signal in dependence on the rotary movement of the gear, which is transmitted to the measuring transducer by way of the shaft. For example, the rotary movement of the above-mentioned gear varies the resistance of a potentiometer which is provided in the measuring transducer. It is also possible to use measuring transducers which operate on an inductive, capacitive, optical or other basis.

Further objects, features and advantages of the present invention will be apparent from the following description of a preferred embodiment thereof.

DESCRIPTION OF THE PREFERRED EMBODIMENT

Figure 1:
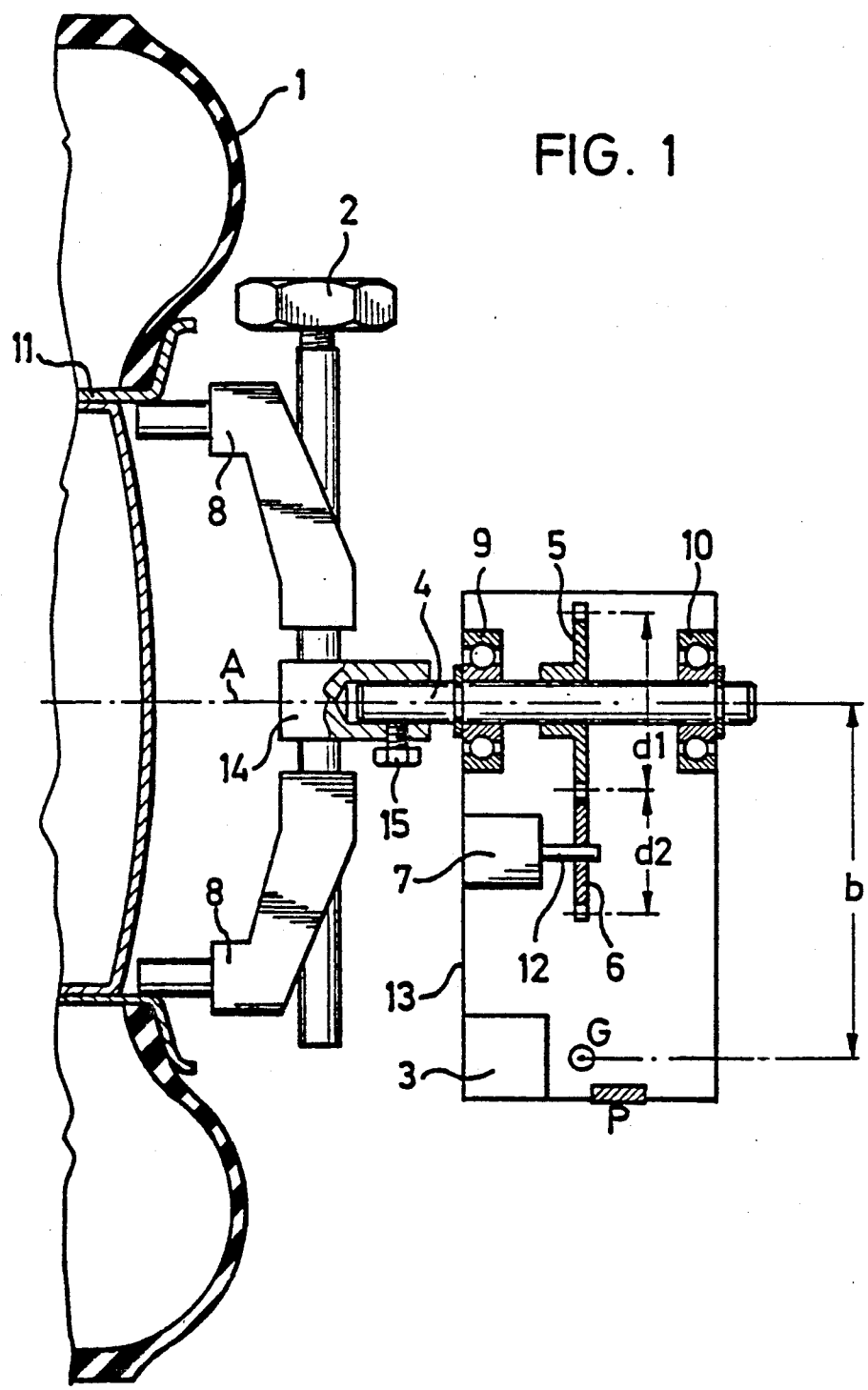
FIG. 1 is a partly sectional diagrammatic front view of an embodiment of the wheel position measuring apparatus according to the invention, in the position of being fixed to a motor vehicle wheel.
Figure 2:
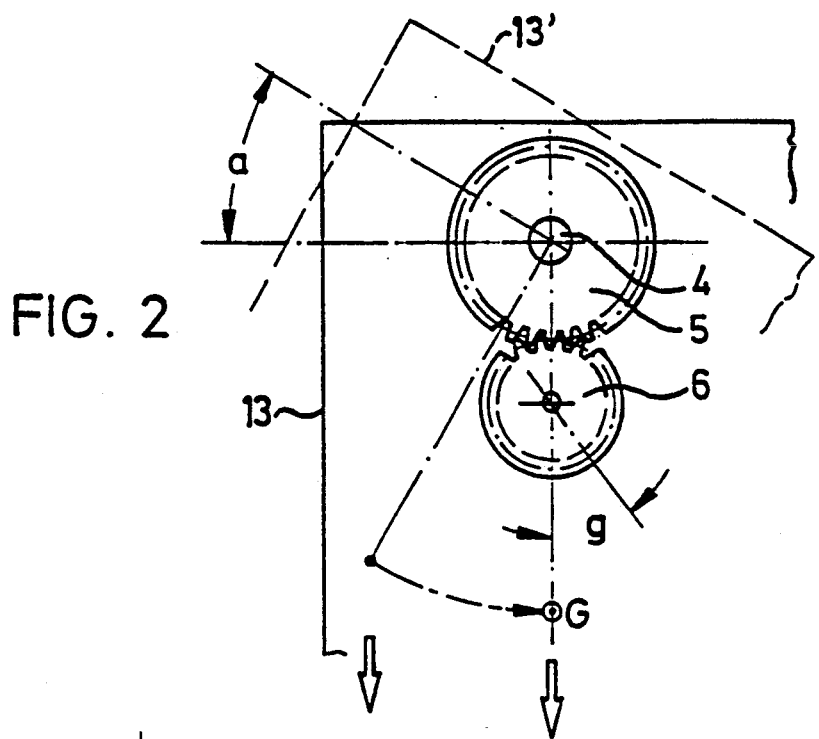
FIG. 2 shows a structural detail used in the embodiment illustrated in FIG. 1.

Referring firstly to FIGS. 1 and 2, shown therein is an embodiment of a wheel position measuring apparatus according to the invention which comprises a detector device 3. The detector device 3 has a sensor device of any suitable kind, for example an optical sensor device which may be in the form of a projector and/or mirror and/or a light source of an infra-red or laser beam generating device. Instead of the optical sensor device, it is also possible to use an electromagnetic sensor device or a mechanical sensor device which can operate on the basis of known principles and which therefore do not need to be described in greater detail herein.

As illustrated, the detector device 3 can be disposed in a housing as indicated diagrammatically at 13, but it is also possible for the detector device 3 to be disposed at the front end of an arm 16 which projects from the housing 13, as shown in FIGS. 4 and 5.

The wheel position measuring apparatus shown in FIGS. 1 and 2, also includes a wheel adaptor. The wheel adaptor comprises holding claws 8 which can be applied to a rim 11 of a motor vehicle wheel whose position is to be measured, with a tire fitted thereon, as indicated at 1 in FIG. 1. The holding claws 8 are fixed centrally to the rim 11 of the motor vehicle wheel by means of the centering screw 2. The wheel adaptor also has a carrier 14 which is connected to the holding claws 8. A mounting shaft or trunnion 4 is fixed to the carrier 14, for example by means of a screw 15. The wheel adaptor is fixed to the rim 11 of the motor vehicle wheel is such a way that the mounting shaft or trunnion 4 is disposed coaxially with respect to the wheel axis A. The wheel adaptor is then fixed to the wheel in centered relationship thereon.

The housing 13 on which the detector device 3 is mounted is mounted on the mounting shaft or trunnion 4 by means of a pivot bearing arrangement, being in the form of two spaced-apart ball bearing assemblies 9 and 10 in the embodiment illustrated in FIG. 1. Instead of the housing 13, the apparatus may have a suitable frame structure on which the detector device 3 is mounted. That configuration provides that the detector device 3 can be mounted on the wheel adaptor pivotably about the wheel axis A when the wheel adaptor is fixed to the motor vehicle wheel whose position is to be measured, in concentric relationship therewith, as described above.

The housing 13 and thus the detector device 3 can be fixed in a given pivotal angular position by an arresting means (now shown).

The housing 13 and the detector device 3 can be pivoted manually by the operator. In the illustrated embodiment however the detector device 3 can be automatically pivoted about the mounting shaft or trunnion 4, that is to say about the wheel axis A, by virtue of the effect of the force of gravity. For example, by the application of an additional weight as indicated at P in FIG. 1, the housing 13 with the detector device 3 mounted thereon can be calibrated or tared in such a way that under the effect of the force of gravity the detector device 3 automatically moves into a position in which it is calibrated in a horizontal direction, as is shown for example in FIG. 4(A) or FIG. 4(C). As shown in FIG. 2, in that way the housing 13 which occupies a position shown in broken line at 13' and which is that broken-line position is pivoted out of the horizontal about an angle indicated at an can automatically pivot under the effect of the force of gravity about the wheel axis A, by pivotal movement of the mounting shaft or trunnion 4 of the pivot bearing 9 and 10. The position of the center of gravity is shown in FIGS. 1 and 2 by the letter G. The force of gravity acts with a lever arm as indicated at b in FIG. 1 on the housing 13 and the units connected thereto. The pivot bearing arrangement 9, 10 has only a low level of friction so that the torque which acts on the housing 13 as a result of the force of gravity is sufficient to produce the automatic pivotal movement thereof.

It will be seen from FIGS. 1 and 2 that the pivotal movement of the housing 13 and the detector device 3 can be suitable sensed by a sensing device. The sensing device essentially comprises a gear 5 which is non-rotatably connected to the mounting shaft or trunnion 4 and a second gear 6 which meshes with the gear 5. The second gear 6 is non-rotatably carried on a shaft 12 of a measuring transducer 7. Upon pivotal movement of the housing 13 out of the position indicated at 13+ in FIG. 2 about the angle a, the gear 6 is also pivoted and rotates with the shaft 12, through an angle as indicated at g in FIG. 2.

That rotary movement through the angel g is transmitted from the shaft 12 to a corresponding transducer element in the measuring transducer 7. That may be for example a potentiometer, the resistance of which is adjusted in dependence on the angle of rotary movement g.

The pivot angle a to be detected or sensed is ascertained on the basis of the following relationship:

$$a = g \times d1/d2$$

where d1 denotes the diameter of the gear 5 and d2 denotes the diameter of the gear 6.

The measuring transducer 7 which acts as an angle sensor is also mounted on the housing 13 and is also pivoted upon pivotal movement of the housing 13 together with the detector device 3 about the wheel axis A in the pivot bearing arrangement 9, 10. That produces the rotary movement of the gear 6 meshing with the stationary gear 5.

Reference will now be made to FIGS. 3 and 4 in order to describe in greater detail use of the construction shown in FIGS. 1 and 2, in an operation for compensating for out-of-trust or run-out of a motor vehicle wheel.

Figure 3A:
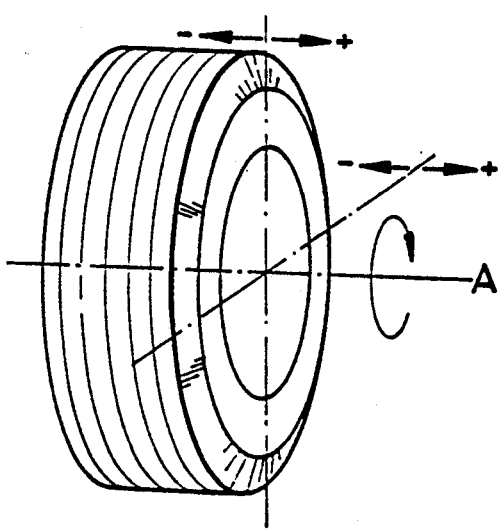
FIG. 3(A) illustrates a vehicle wheel which is rotatable about an axis A and whose deflections in the two measurement planes indicated are to be measured.
Figure 3B:
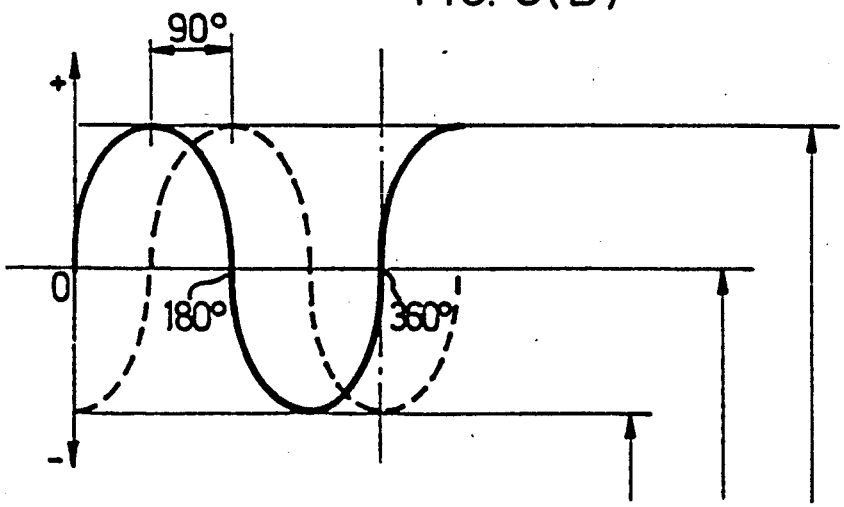
FIG. 3(B) shows a sinusoidal fluctuation signal with respect to a camber plane (solid line), and, shifted through 90° degrees, a sinusoidal fluctuation signal with respect to a tracking plane (broken line).
Figure 4A:
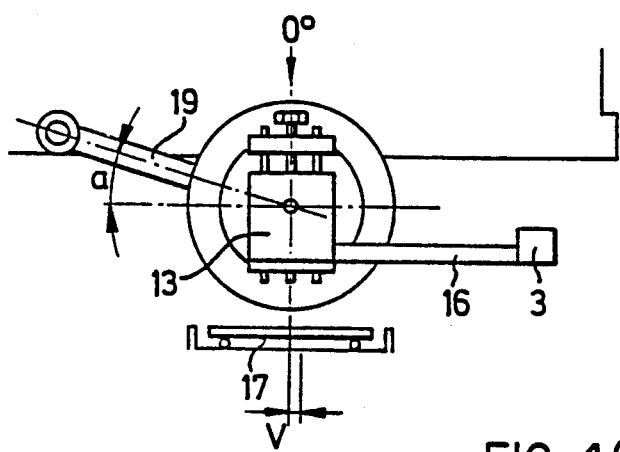
FIGS. 4(A)–4(C) illustrate schematically and graphically how the present invention is used to measure and compensate for out-of-truth of a vehicle wheel after the run-out of the vehicle wheel is measured.
Figure 4A:
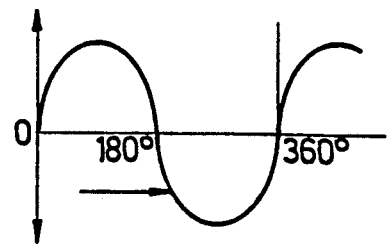
Figure 4B:
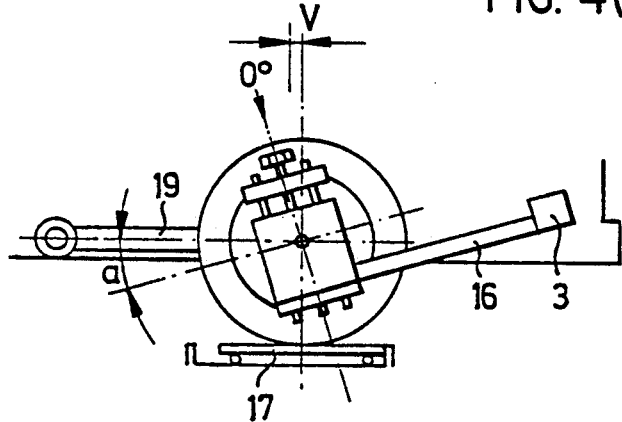
Figure 4C:
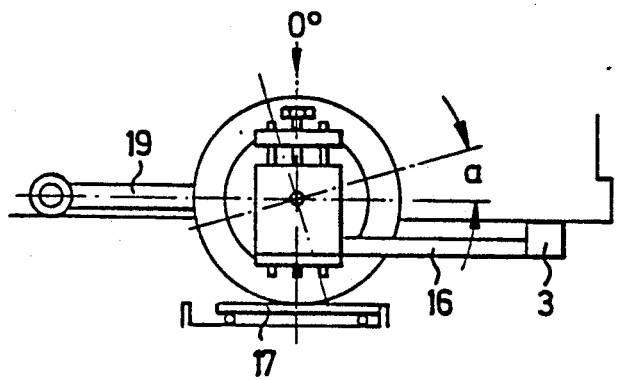
Figure 4C:
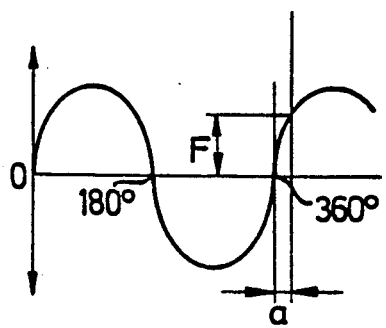

The adaptor is fixed to the wheel, which is in a raised condition, for the operation for compensating for out-of-trust or run-out of the wheel. A suitable sensor which may be for example optical, electronic or otherwise is fixed to the adaptor in order to detect the deflections which occur as a result of the out-of-true condition of the wheel. For that operation, the motor vehicle wheel in the condition of being lifted off the ground, with the wheel adaptor fixed thereto in centered relationship, is caused to rotate. During one or more revolutions of the wheel, the sensor detects the resulting deflections, which are of a sinusoidal configuration, in first and second mutually perpendicular planes (camber and/or track). FIG. 3(A) shows the rotation of the motor vehicle wheel about the axis A and the two measurement planes, in diagrammatic form. FIG. 3(B) shows the sinusoidal fluctuation signals in respect of the camber plane (solid line), which are detected by the sensor (not shown), and, shifted through 90°, the sinusoidal fluctuation signals in respect of the tracking plane (broken line). those sinusoidal fluctuations result from the out-of-truth condition of the wheel and range between minimum and maximum deflection values. The center line of the sinusoidal fluctuations forms the reference axis. On the reference axis, for example the rotary angular position at 360°, which occurs after a respective revolution, can be taken as the initial angular position for the further measurement operations, for example for amber measurement or for tracking measurement. The storage values in respect of camber and tracking are assumed to occur at 360° in the graph shown in FIG. 3(B). Here the value for the tracking plane is the maximum value in respect of wheel rim deflection and the value for the camber plane is the mean value. Those values can be electronically stored and used in the subsequent wheel measuring procedure. So that the wheel out-of-truth compensation effect is still retained, the wheel adaptor should no longer be removed from the wheel and the detector device 3 is aligned on the wheel adaptor with that initial rotary angular position for the vehicle wheel. The housing 13 and the detector device 3 which in the embodiment shown in FIGS. 4 and 5 is disposed at the front end of a support arm 16 then occupies for example the position shown in FIG. 4(A). FIG. 4(A) also represents the sinusoidal parameter value in respect of out-of-truth or run-out of the wheel (in the camber plane). The storage value at 360° corresponds to the new zero point which is aligned with the arrangement of wheel adaptor, housing 13, support arm 16 and detector device 3, for the measurement operation.

When the motor vehicle wheel is lowered, the wheel is rotated when it is put down on to a displaceable platform 17 which is used in the measurement operation, due to the configuration of the suspension of the wheel, which is diagrammatically indicated at 19 in FIG. 4, and possibly also due to the springing effect and the damper device of the wheel suspension. As a comparison between FIG. 4(A) and FIG. 4(B) shows, when the wheel is lowered on to the platform 17, the platform 17 is displaced by a distance indicated at V between FIGS. 4(A) and 4(B). As shown in FIG. 4(C), the housing 13, the support arm 16 and the detector device 3 are aligned with the horizontal position by virtue of the effect of the center of gravity or by manual operation by the operator, with the housing 13, the support arm 16 and the detector device 3 performing a pivotal movement about the mounting shaft or trunnion 4 or the wheel axis A, through a pivotal angle as indicated at a in FIG. 4, relative to the wheel adaptor 2, 8. That pivot angle a corresponds to a compensation error, that is to say displacement of the zero point out of the zero point position obtained in the wheel out-of-truth compensation operation, as was described above by the term 'storage value' and as identified in the graphs shown in FIGS. 4(A) and 4(B). As can be seen from the graph in FIG. 4(C), the pivot angle a acts as a compensation error as identified by F and, if it is not properly taken into account, would be involved as such in the subsequent measuring operations.

It will be seen however that the above-described embodiment of the invention as shown in FIGS. 1 and 2 makes it possible to ascertain the pivot angle a in the manner described above and to store it appropriately in the evaluation electronic system of the apparatus and to take account of same in a subsequent operation for calculating the wheel position.

Figure 5A:
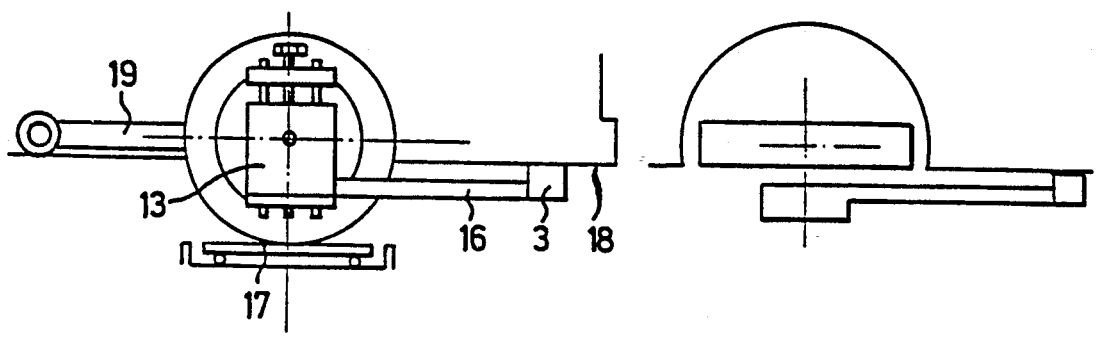
FIGS. 5(A)–5(C) illustrate how the present invention is used to measure a steering swivel pin angle, wherein FIGS. 5(A)–5(C) each shown a side view of a wheel with the apparatus of the present invention attached thereto and a corresponding schematic top view thereof.
Figure 5B:
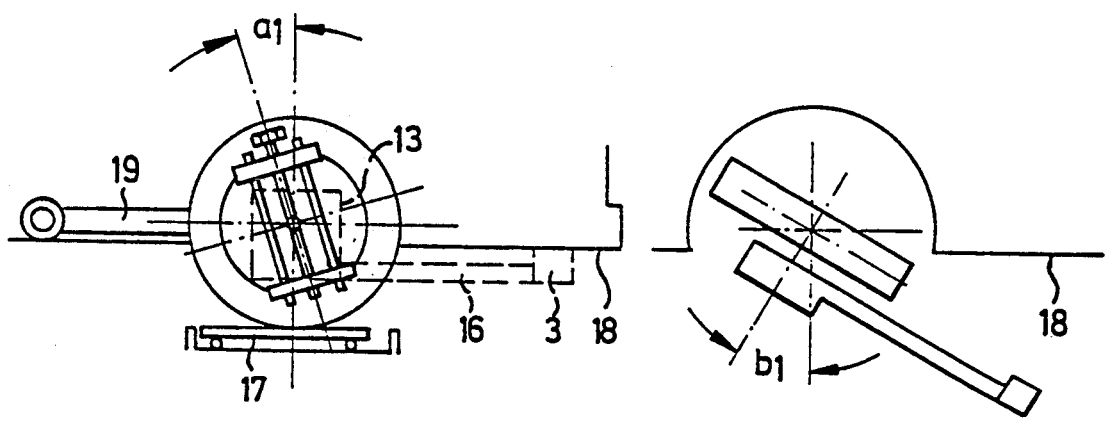

Reference will now be made to FIG. 5(A) showing the initial position of the wheel position measuring apparatus in accordance with the configuration shown in FIGS. 1 and 2 when measuring the steering swivel pin angle of the wheel, being a side view in the left-hand part of the FIG. and a view from above in the right-hand part. The steering swivel pin angle represents the angle through which the swivel pin or king pin is inclined inwardly relative to a line perpendicular to the transverse axis of the vehicle. The steering swivel pin angle is measured in degrees of angle and that angle is derived from measurement of the angle indicated at a1 and a2 in FIGS. 5(B) and 5(C) respectively, when steering lock of the angle indicated at b1 and b2 is applied. When steering lock is applied relative to the motor vehicle of which the outline configuration is diagrammatically shown at 18 in FIG. 5, outwardly through a lock angle as indicated at b1 in FIG. 5(B), the wheel together with the wheel adaptor fixed thereto pivots through the angle a1 relative to the housing 13 which retains its position s shown in broken lines. That angle a1 is detected by the transducer 7 in the manner described above and a corresponding signal is transmitted to an electronic processing system (not shown).

Figure 5C:
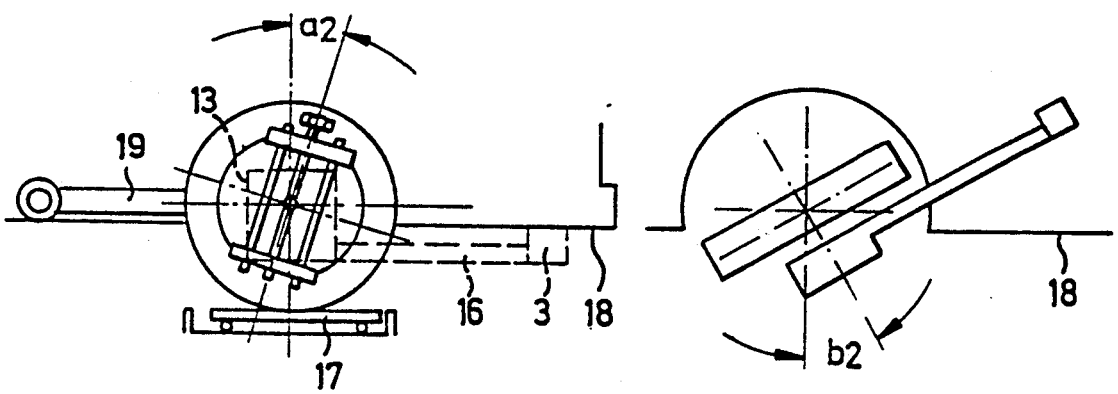

When steering lock is applied relative to the vehicle 18 inwardly through a lock angle as indicated at b2 in FIG. 5(C), the vehicle wheel together with the adaptor fixed thereto pivots through an angle indicated at a2 relative to the housing 13 which retains its position as shown in broken line. That angle is also measured by means of the measuring transducer arrangement indicated at 7 in FIGS. 1 and 2, which represents an angle sensor.

The angular value in respect of the steering swivel pin angle S is obtained from the foregoing angles, on the basis of the following formula:

$$S = (a1 - a2)/(\sin b2 - \sin b1).$$

In that measurement operation, the arm 16 and the detector device disposed thereon, which are not required in regard to determining the steering swivel pin angle, can be so arranged that their pivotal movement is not adversely affected by the vehicle 18 or parts thereof, or other obstacles which may be present on the ground. It will also be apparent from the foregoing that there is no need for an additional sensor for measuring the steering swivel pin angle when using a wheel position measuring apparatus according to the invention with an angle sensor 7 of the above-described kind.

It will be appreciated that the above-described apparatus has been set forth solely by way of example and illustration of the present invention and that various modifications and alterations may be made therein without thereby departing from the spirit and scope of the invention.

We claim:

1. A wheel position measuring apparatus comprising:
   (a) a detector device;
   (b) a wheel adaptor for pivotably mounting the detector device to a vehicle wheel in a predetermined relationship relative to a rotational axis of the wheel; and
   (c) an angle measuring device operatively disposed between the detector device and the wheel adaptor for measuring an angle between the wheel adaptor and the detector device corresponding to an angular displacement of the wheel that occurs between a lifted position and a lowered, weight-bearing position, said angle measuring device being oriented to measure an angle in a plane which is substantially perpendicular to the rotational axis of the wheel, said angle measuring device further including:
      (1) sensing means for determining the pivotal movement of the detector device about the wheel axis following lowering the wheel to a weight-bearing position; and
      (2) a measuring transducer for converting the sensed pivotal movement into an electrical signal, said measuring transducer including a first gear fixedly connected to said wheel adaptor and a second gear which meshes with said first gear and which is connected to said measuring transducer.

2. Apparatus as set forth in claim 1 including pivot bearing means mounting the detector device on the wheel adaptor pivotably about the wheel axis, said angle being determined by derivation from a pivotal movement, caused by the force of gravity, of the detector device about the pivot bearing means.

3. Apparatus as set forth in claim 2 including a mounting trunnion means fixed to the wheel adaptor at a position corresponding to the wheel axis, said pivot bearing means being disposed on said mounting trussion means for mounting said detector device thereon pivotably thereabout.

4. Apparatus as set forth in claim 1 wherein said measuring transducer includes a potentiometer.

5. Apparatus as set forth in claim 1 wherein said sensing means and said detector device are rigidly connected together.

6. Apparatus as set forth in claim 1 wherein the angle measured by said angle measuring device is an angle through which the detector device is pivoted about the wheel axis relative to the horizontal.

7. Apparatus as set forth in claim 1 wherein said angle measuring device measures an angle which corresponds to an angular difference between first and second angular positions of the detector device when the wheel is lifted and when the wheel is set down into a weight-bearing position, respectively.

8. A method for compensating for an angular error in a run-out measurement of a vehicle wheel, comprising the steps of:
   (a) raising a vehicle wheel off the ground on which a run-out is to be measured;
   (b) rotating the raised vehicle wheel;
   (c) sensing deflections of said rotating vehicle wheel;
   (d) converting the sensed deflections of the rotating vehicle wheel into a sinusoidal fluctuation signal;
   (e) recording said sinusoidal fluctuation signal;
   (f) stopping the rotation of the vehicle wheel;
   (g) determining and recording an initial rotational position of the raised vehicle wheel;
   (h) lowering said vehicle wheel onto a surface such that the vehicle wheel bears weight, said surface being substantially free to move in response to forces generated by the lowered vehicle wheel;
   (i) measuring a rotational displacement of said wheel in a plane substantially perpendicular to a rotational axis of the wheel that occurs between said initial rotational position and a rotational position of said wheel in a lowered weight-bearing condition, said rotational displacement being facilitated by said moveable surface and corresponding to an angular error of said run-out measurement of said wheel; and
   (j) compensating for said angular error of step (i) by adjusting said recorded sinusoidal fluctuation signal by an amount equal to said rotational displacement of the vehicle wheel.

* * * * *